(12) United States Patent
Hasegawa et al.

(10) Patent No.: US 11,613,487 B2
(45) Date of Patent: Mar. 28, 2023

(54) METHOD FOR PRODUCING GLASS ARTICLE

(71) Applicant: Nippon Electric Glass Co., Ltd., Shiga (JP)

(72) Inventors: Toru Hasegawa, Shiga (JP); Toru Sakurabayashi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 52 days.

(21) Appl. No.: 16/645,045

(22) PCT Filed: Sep. 11, 2018

(86) PCT No.: PCT/JP2018/033689
§ 371 (c)(1),
(2) Date: Mar. 6, 2020

(87) PCT Pub. No.: WO2019/054385
PCT Pub. Date: Mar. 21, 2019

(65) Prior Publication Data
US 2021/0122658 A1    Apr. 29, 2021

(30) Foreign Application Priority Data
Sep. 13, 2017    (JP) .............................. JP2017-175769

(51) Int. Cl.
*C03B 5/16* (2006.01)
*C03B 3/00* (2006.01)
*C03B 5/027* (2006.01)

(52) U.S. Cl.
CPC ................ *C03B 5/16* (2013.01); *C03B 3/005* (2013.01); *C03B 5/027* (2013.01)

(58) Field of Classification Search
CPC .. C03B 3/00; C03B 3/005; C03B 5/16; C03B 5/027
See application file for complete search history.

(56) References Cited

U.S. PATENT DOCUMENTS 3,885,945 A * 5/1975 Rees ....................... C03B 5/185
65/135.7

FOREIGN PATENT DOCUMENTS

| JP | 59-26931 | 2/1984 |
| JP | 2003-183031 | 7/2003 |

(Continued)

OTHER PUBLICATIONS

JP2010222217A—Machine Translation of Description Performed by EPO on Oct. 21, 2021. (Year: 2021).*

(Continued)

*Primary Examiner* — Lisa L Herring
(74) *Attorney, Agent, or Firm* — Wenderoth, Lind & Ponack, L.L.P.

(57) ABSTRACT

A manufacturing method for a glass article includes a supply step of supplying a glass raw material onto a surface of a molten glass accommodated in a melting chamber of a glass melting furnace from a supply unit mounted to a front wall of the melting chamber, and a melting step of melting the supplied glass raw material through heating with an electrode immersed in the molten glass in the melting chamber. The method also includes an outflow step of causing the molten glass to flow outside the melting chamber from an outflow port provided at a rear wall of the melting chamber, wherein 60% to 95% of an area of the surface of the molten glass in the melting chamber is covered with the glass raw material supplied in the supply step.

6 Claims, 2 Drawing Sheets

(56) References Cited

FOREIGN PATENT DOCUMENTS

JP        2010222217 A  * 10/2010    ............. C03B 3/005
WO       WO-0000440 A1 *  1/2000    ............... C03B 5/04
WO       2012/132474     10/2012

OTHER PUBLICATIONS

International Preliminary Report on Patentability and Written Opinion of the International Searching Authority issued Mar. 17, 2020 in International (PCT) Application No. PCT/JP2018/033689.
International Search Report dated Oct. 30, 2018 in International (PCT) Application No. PCT/JP2018/033689.

* cited by examiner

METHOD FOR PRODUCING GLASS ARTICLE

TECHNICAL FIELD

The present invention relates to a manufacturing method for a glass article.

BACKGROUND ART

As is well known, a glass article typified by a glass sheet, a glass tube, a glass fiber, and the like is manufactured by forming molten glass generated by melting a glass raw material in a glass melting furnace into a predetermined shape. In this connection, in Patent Literature 1, there is disclosed an example of a method of generating molten glass with a view to manufacturing a glass article.

The disclosed method includes: a supply step of supplying a glass raw material onto the surface of molten glass accommodated in a melting chamber of a glass melting furnace (in Patent Literature 1, an electric melting furnace for manufacturing a glass fiber); a melting step of melting the supplied glass raw material through heating with an electrode immersed in the molten glass in the melting chamber; and an outflow step of causing the molten glass to flow outside the melting chamber.

CITATION LIST

Patent Literature 1: JP 2003-183031 A

SUMMARY OF INVENTION

Technical Problem

However, when the molten glass is generated by the above-mentioned method, there are the following problems to be solved.

Specifically, in the above-mentioned method, the glass raw material before melting covers the surface of the molten glass in the melting chamber. In this case, depending on the amount of the glass raw material, components of the molten glass excessively volatilize, and thus a heterogeneous base material in which the concentration of silica is partially high is generated in the molten glass. Moreover, in some cases, the molten glass including the heterogeneous base material flows outside the melting chamber. In addition, depending on the amount of the glass raw material, it becomes difficult to sufficiently remove bubbles contained in the molten glass. As a result, in some cases, the molten glass containing the bubbles flows outside the melting chamber.

Moreover, a glass article manufactured by forming such molten glass including the heterogeneous base material or containing the bubbles is liable to have a defect (a cord, bubbles, or the like), resulting in a problem in that the quality of the glass article as a product is significantly reduced, or the glass article cannot be adopted as a product. Therefore, it is required that the amount of the glass raw material that covers the surface of the molten glass be made appropriate to improve the quality of the glass article to be manufactured. At present, however, such requirement cannot be satisfied yet.

The present invention has been made in view of the above-mentioned circumstances, and a technical object of the present invention is to, in melting a glass raw material supplied onto molten glass in a melting chamber of a glass melting furnace to generate molten glass and causing the molten glass to flow outside the melting chamber, to thereby manufacture a glass article from the molten glass, improve the quality of the glass article.

Solution to Problem

According to one embodiment of the present invention, which has been devised to achieve the above-mentioned object, there is provided a manufacturing method for a glass article, comprising: a supply step of supplying a glass raw material onto a surface of molten glass accommodated in a melting chamber of a glass melting furnace from a supply unit mounted to a front wall of the melting chamber; a melting step of melting the supplied glass raw material through heating with an electrode immersed in the molten glass in the melting chamber; and an outflow step of causing the molten glass to flow outside the melting chamber from an outflow port provided at a rear wall of the melting chamber, wherein 60% to 95% of an area of the surface of the molten glass in the melting chamber is covered with the glass raw material supplied in the supply step.

The inventor of the present invention has made extensive investigations, and as a result, has found that, when 60% to 95% of the area of the surface of the molten glass in the melting chamber is covered with the glass raw material supplied in the supply step, excessive volatilization of components of the molten glass can be prevented, and bubbles contained in the molten glass can be sufficiently removed. Specifically, the inventor has found that, when the ratio of the area of the surface of the molten glass covered with the glass raw material is 60% or more, the excessive volatilization can be prevented, and when the ratio is 95% or less, the bubbles can be sufficiently removed. With this, by the manufacturing method for a glass article according to the one embodiment of the present invention, the frequency at which a glass article is formed from the molten glass including a heterogeneous base material or containing bubbles is reduced. As a result, the occurrence of a defect in a glass article to be manufactured can be suppressed, and thus the quality of the glass article can be improved.

In the above-mentioned method, it is preferred that when a length of the surface of the molten glass along a flowing direction of the glass raw material in the melting chamber is represented by L, and a distance between the glass raw material located on a most upstream side and the glass raw material located on a most downstream side in the flowing direction is represented by R, the following relationship be satisfied.

$$R \geq 0.65L$$

With this, the excessive volatilization of the components of the molten glass can be more effectively suppressed.

In the above-mentioned method, it is preferred that a difference in temperature between a temperature of a surface of the glass raw material supplied in the supply step and a temperature of the molten glass present on a bottom wall of the melting chamber be set to 200° C. or more.

With this, the state in which 60% to 95% of the area of the surface of the molten glass in the melting chamber is covered with the glass raw material can be stably maintained, and thus the quality of the glass article can be further improved.

In the above-mentioned method, it is preferred that a difference in viscosity between a viscosity of the molten glass present at an interface with the glass raw material supplied in the supply step and a viscosity of the molten glass present on a bottom wall of the melting chamber be set to 2,500 dPa·s or more.

Also with this, the state in which 60% to 95% of the area of the surface of the molten glass in the melting chamber is covered with the glass raw material can be stably maintained, and thus the quality of the glass article can be further improved.

In the above-mentioned method, it is preferred that the front wall have mounted thereto a plurality of supply units, and a gap in which the molten glass is exposed be formed between the glass raw materials supplied from the plurality of supply units.

With this, the bubbles contained in the molten glass can be released from the gap in which the molten glass is exposed. Therefore, the removal of bubbles from the molten glass is promoted, and thus the quality of the glass article can be further improved.

In the above-mentioned method, at least part of a portion of the surface of the molten glass in the melting chamber, the portion being prevented from being covered with the glass raw material, may be covered with a bubble layer.

With this, heat dissipation from the molten glass can be reduced in the portion covered with the bubble layer. Therefore, the glass raw material can be melted with higher energy conservation.

Advantageous Effects of Invention

According to the present invention, in melting a glass raw material supplied onto molten glass in a melting chamber of a glass melting furnace to generate molten glass and causing the molten glass to flow outside the melting chamber, to thereby manufacture a glass article from the molten glass, the quality of the glass article can be improved.

DESCRIPTION OF EMBODIMENTS

Referring to the accompanying drawings, a manufacturing method for a glass article according to an embodiment of the present invention is described below.

First Embodiment

First, a glass melting furnace to be used in a manufacturing method for a glass article according to a first embodiment of the present invention is described.

Figure 1:
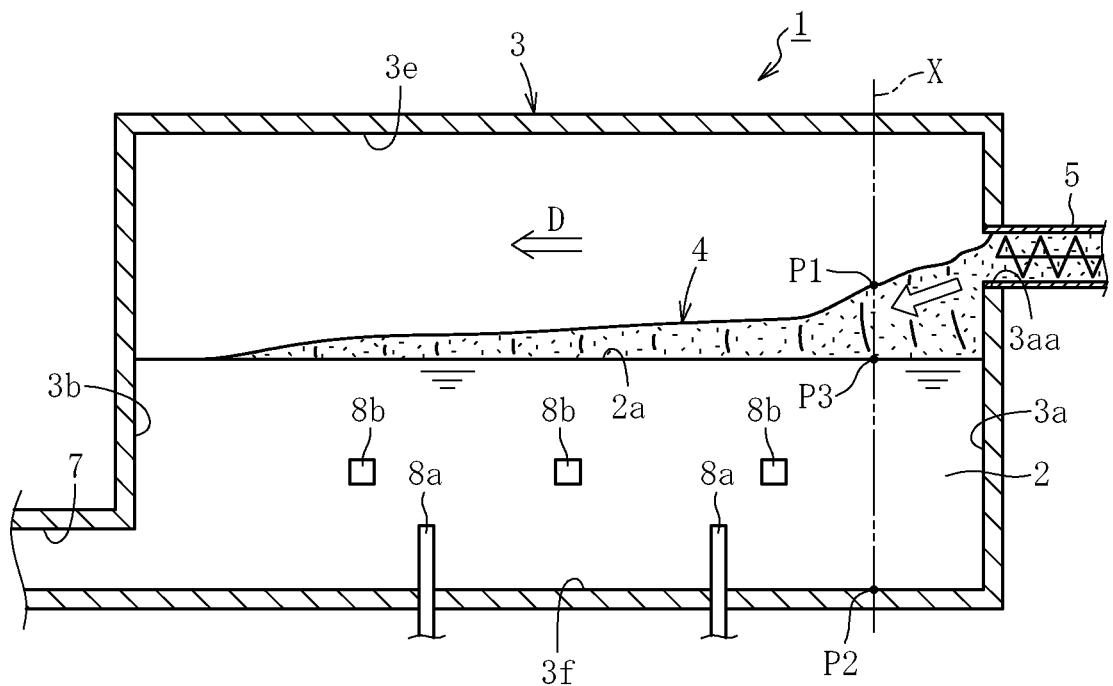
FIG. 1 is a longitudinal sectional side view for illustrating a manufacturing method for a glass article according to a first embodiment of the present invention.
Figure 2:
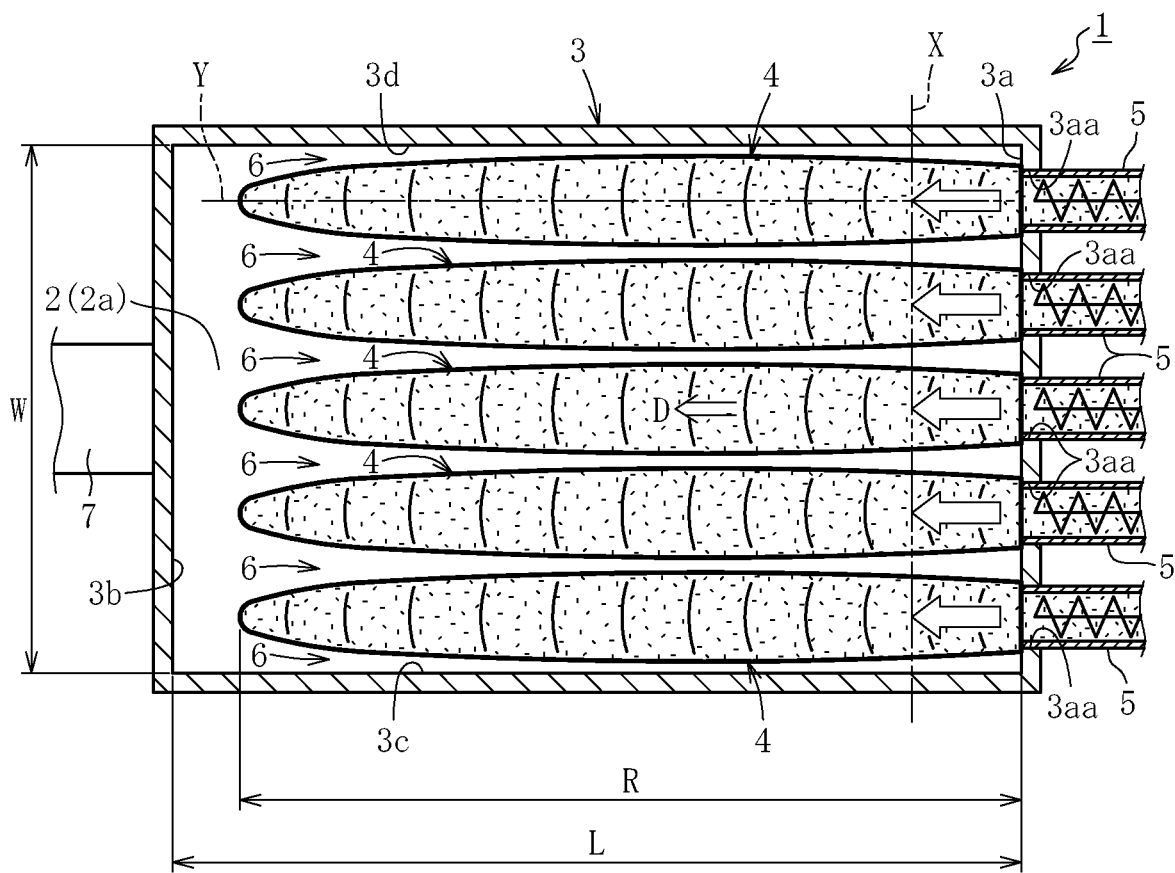
FIG. 2 is a transverse sectional plan view for illustrating the manufacturing method for a glass article according to the first embodiment of the present invention.

As illustrated in FIG. 1 and FIG. 2, a glass melting furnace 1 is configured as an electric melting furnace, and comprises a melting chamber 3 capable of accommodating a molten glass 2. The glass melting furnace 1 is configured to heat a glass raw material 4 continuously supplied onto a surface 2a of the molten glass 2 in the melting chamber 3 to successively melt the glass raw material 4, and is also configured to cause the molten glass 2 to flow outside the melting chamber 3.

The melting chamber 3 is formed of a refractory material, and has a rectangular sectional shape in plan view. In addition, the melting chamber 3 comprises: a front wall 3a located at an upstream end and a rear wall 3b located at a downstream end in a flowing direction D of the glass raw material (molten glass 2) in the melting chamber 3 (hereinafter simply represented as "flowing direction D"); a pair of side walls 3c and 3d; a ceiling wall 3e; and a bottom wall 3f.

Five screw feeders 5 each serving as a supply unit configured to continuously supply the glass raw material 4 are mounted to the front wall 3a in parallel. The five screw feeders 5 are each inserted into an opening 3aa formed in the front wall 3a without forming a gap. The glass raw materials 4 supplied from the screw feeders 5 each extend along the flowing direction D on the surface 2a of the molten glass 2, and a gap 6 in which the glass raw material 4 is not present (the surface 2a of the molten glass 2 is exposed) is formed between the glass raw materials 4. That is, the glass raw materials 4 flow from a front wall 3a side to a rear wall 3b side without joining with each other in the course of their flowing. Further, the gap 6 in which the glass raw material 4 is not present is also formed between the glass raw material 4 supplied from the screw feeder 5 at the front and the side wall 3c and between the glass raw material 4 supplied from the screw feeder 5 at the tail and the side wall 3d. The glass raw materials 4 supplied from the five screw feeders 5 each have added thereto tin oxide as a fining agent.

An outflow port 7 configured to cause the molten glass 2 to continuously flow outside is formed on the rear wall 3b. The rear wall 3b is located at a distance L from the front wall 3a along the flowing direction D. The distance L is equal to the length of the surface 2a of the molten glass 2 along the flowing direction D. The pair of side walls 3c and 3d are located so as to be spaced apart from each other at a distance W along a direction perpendicular to the flowing direction D (hereinafter represented as "perpendicular direction"). The distance W is equal to the width of the surface 2a of the molten glass 2 along the perpendicular direction. With this, the area of the surface 2a of the molten glass 2 accommodated in the melting chamber 3 is equal to the product of L and W (L×W).

Herein, in the glass melting furnace 1, the amount of the glass raw material 4 to be supplied from the screw feeder 5 can be freely adjusted.

A plurality of rod-shaped electrodes 8a each configured to heat the molten glass 2 through application of a current are mounted to the bottom wall 3f under the state in which the plurality of electrodes 8a are immersed in the molten glass 2. In addition, a plurality of sheet-shaped electrodes 8b each configured to heat the molten glass 2 through application of a current are mounted to each of the pair of side walls 3c and 3d under the state in which the plurality of electrodes 8b are immersed in the molten glass 2. Energy (heat energy imparted to the molten glass 2) generated with the electrodes 8a and 8b may be adjusted by adjusting a voltage applied to the electrodes 8a and 8b. Moreover, in association with the heating of the molten glass 2 with the electrodes 8a and 8b, the glass raw material 4 on the molten glass 2 is indirectly heated to be melted. With this, a new molten glass 2 is successively generated.

Herein, in the glass melting furnace 1, after the start of continuous generation of the molten glass 2, heat energy imparted to the molten glass 2 in the melting chamber 3 is generated only with the electrodes 8a and 8b. In a stage before the continuous generation of the molten glass 2 is started, the molten glass 2 and/or the glass raw material 4 may be heated with, for example, burners (illustration thereof is omitted) mounted to the side walls 3c and 3d.

The manufacturing method for a glass article according to the first embodiment using the above-mentioned glass melting furnace 1 is described below.

In the manufacturing method for a glass article, in generating the molten glass 2 with a view to manufacturing a glass substrate for a display serving as a glass article, the following steps are performed. The glass article is not limited to the glass substrate for a display, and may be, for example, a glass sheet, a glass tube, or a glass fiber.

In this method, a supply step of supplying the glass raw material 4 onto the surface 2a of the molten glass 2 accommodated in the melting chamber 3 of the glass melting furnace 1 from the screw feeder 5 mounted to the front wall 3a of the melting chamber 3; a melting step of melting the supplied glass raw material 4 through heating with the electrodes 8a and 8b immersed in the molten glass 2 in the melting chamber 3; and an outflow step of causing the molten glass 2 to flow outside the melting chamber 3 from the outflow port 7 provided at the rear wall 3b of the melting chamber 3 are performed.

Moreover, in this method, the state in which 60% to 95% of the area of the surface 2a of the molten glass 2 in the melting chamber 3 is covered with the glass raw material 4 supplied in the supply step is maintained. In this embodiment, the ratio of the area of portions each enclosed by the extra wide line of FIG. 2 (total area of portions of the surface 2a each covered with the "glass raw material 4 before melting") to the area calculated as the product of L and W (L×W) (total area of the surface 2a of the molten glass 2) is kept at from 60% to 95%. The total area of the surface 2a of the molten glass 2 is not limited to the area of a portion in which the molten glass 2 is exposed, and includes the areas of the portions each covered with the glass raw material 4 before melting.

Herein, in this embodiment, the "portion covered with the glass raw material 4 before melting" means a portion of the surface of the molten glass 2 in which particles of the glass raw material 4 are present. In addition, the "portion in which the molten glass 2 is exposed" means a portion of the surface of the molten glass 2 in which the particles of the glass raw material 4 are melted and are not present.

The above-mentioned ratio is calculated by the following procedure.

(a) An image is picked up with an image pickup unit (e.g., a camera) configured to collect the surface 2a of the molten glass (including the portion covered with the glass raw material 4 before melting) in the field of view.

(b) In the image having been picked up, the number of pixels of the surface 2a of the molten glass 2 (including the portion covered with the glass raw material 4 before melting) is counted.

(c) The portion in which the molten glass is exposed and the portion covered with the glass raw material 4 before melting are discriminated from each other based on brightness, and the number of pixels of the portion covered with the glass raw material 4 before melting is counted.

(d) The number of pixels counted in the item (c) is divided by the number of pixels counted in the item (b), to thereby calculate the ratio.

As required, the image having been picked up may be corrected as described in WO 2013/100069 A1.

In the item (c) of the above-mentioned procedure, the portion in which the molten glass is exposed and the portion covered with the glass raw material 4 before melting are discriminated from each other based on brightness. The brightness serving as a standard changes depending on the glass melting furnace, and hence is required to be set for every glass melting furnace.

The brightness serving as a standard is set by the following procedure.

(a) An image is picked up with an image pickup unit configured to collect the surface 2a of the molten glass 2 (including the portion covered with the glass raw material 4 before melting) in the field of view.

(b) Samples are collected from an uppermost layer out of the molten glass 2 and the glass raw material 4 at a plurality of points around an interface between the portion in which the molten glass is exposed and the portion covered with the glass raw material 4 before melting. When a bubble layer is present on the surface, the surface is avoided at the time of collection, for example, with a jig used for sample collection.

(c) The collected samples are each poured into a mold and cooled, followed by being cut, to thereby produce a plurality of samples.

(d) With respect to an arbitrary region measuring 10 mm by 10 mm on a cut surface of each sample, the ratio of the area of the glass raw material remaining unmelted is calculated. In addition, the brightness at each collection position is obtained through use of the image of the item (a).

(e) A relationship between the ratio of the area of the glass raw material remaining unmelted and the brightness is established based on the results obtained in the item (d), and the brightness at which the ratio of the area of the glass raw material remaining unmelted is 30% is determined and used as a standard.

The above-mentioned ratio is adjusted by adjusting at least one of: (1) the supply amount of the glass raw material by the screw feeder 5; or (2) energy generated with the electrodes 8a and 8b. That is, when the ratio is to be increased, at least one of the following adjustments is performed: increase the supply amount of the item (1); and reduce the energy of the item (2). Meanwhile, when the ratio is to be reduced, at least one of the following adjustments is performed: reduce the supply amount of the item (1) d; and increase the energy of the item (2).

In addition, in this method, a distance R from the glass raw material 4 located on a most upstream side to the glass raw material 4 located on a most downstream side in the flowing direction D (the distance R is equal to a distance from the front wall 3a to the glass raw material 4 located on the most downstream side) is adjusted so that the relationship of R≥0.65L is satisfied by adjusting at least one of the item (1) or the item (2). The distance R is preferably set to 0.95L or less. In addition, the distance R may be adjusted by changing the distribution of the energy generated with the electrodes 8a and 8b in the flowing direction D.

Further, in this method, a difference in temperature between the temperature of the surface of the glass raw material 4 and the temperature of the molten glass 2 present on the bottom wall 3f is adjusted to 200° C. or more by adjusting at least one of the item (1) or the item (2). The above-mentioned difference in temperature may be adjusted by changing the lengths of the electrodes 8a and 8b to be immersed. In addition, from the viewpoint of supplying and melting the glass raw material 4 stably, the difference in temperature is preferably set to 1,000° C. or less. In the present invention, the temperature of the surface of the glass raw material 4 is defined as a temperature at a point P1 of FIG. 1, and the temperature of the molten glass 2 present on the bottom wall 3f is defined as a temperature at a point P2 of FIG. 1. The point P1, the point P2, and a point P3 described below are each located at a position X at a distance L/10 from the front wall 3a in the flowing direction D. In addition, the point P1 to the point P3 are each located at a center position Y of the screw feeder 5 serving as a supply unit in a direction perpendicular to the flowing direction D (see FIG. 2).

Besides, a difference in viscosity between the viscosity of the molten glass 2 present at an interface with the glass raw material 4 and the viscosity of the molten glass 2 present on the bottom wall 3f is adjusted to 2,500 dPa·s or more by adjusting at least one of the item (1) or the item (2). The above-mentioned difference in viscosity may be adjusted by changing the lengths of the electrodes 8a and 8b to be immersed. In addition, from the viewpoint of supplying and melting the glass raw material 4 stably, the difference in viscosity is preferably set to $10^{19}$ dPa·s or less. In the present invention, the viscosity of the molten glass 2 present at an interface with the glass raw material 4 is defined as a viscosity at the point P3 of FIG. 1, and the viscosity of the molten glass 2 present on the bottom wall 3f is defined as a viscosity at the point P2 of FIG. 1.

The main action and effect exhibited by the above-mentioned manufacturing method for a glass article are described below.

In the manufacturing method for a glass article, the ratio of the area of the surface 2a of the molten glass 2 covered with the glass raw material 4 is 60% or more, and hence excessive volatilization of components of the molten glass 2 can be prevented. In addition, the ratio of the area of the surface 2a of the molten glass 2 covered with the glass raw material 4 is 95% or less, and hence bubbles contained in the molten glass 2 can be sufficiently removed. With this, the frequency at which a glass article (in this case, a glass substrate for a display) is formed from the molten glass 2 including a heterogeneous base material or containing bubbles can be reduced. As a result, the occurrence of a defect in a glass article to be manufactured can be suppressed, and thus the quality of the glass article can be improved. From the viewpoint of further improving the quality of the glass article, the ratio of the area covered with the glass raw material 4 is preferably 65% or more. From the same viewpoint, the ratio of the area covered with the glass raw material 4 is preferably 90% or less, more preferably 85% or less.

When the gap 6 is formed between the glass raw materials 4 and 4, the removal of bubbles from the molten glass 2 is further promoted, and thus the quality of the glass article can be further improved. Therefore, it is preferred that the gap 6 be formed between the glass raw materials 4 and 4. In this case, the width of the gap 6 between the glass raw materials 4 and 4 is preferably set to from 10 mm to 500 mm.

In the glass melting furnace 1, after the continuous generation of the molten glass 2 is started, heat energy imparted to the molten glass 2 in the melting chamber 3 is generated only with the electrodes 8a and 8b. In this case, the atmosphere in the glass melting furnace 1 is dry as compared to the case of using combustion with a burner in combination. Therefore, moisture in the atmosphere can be prevented from being dissolved in the molten glass 2, and thus the β-OH value of the glass article to be obtained can be reduced. With this, compaction at the time of heating the glass article to be obtained can be reduced, and a glass article suitable as a glass substrate for a display can be obtained.

A manufacturing method for a glass article according to a second embodiment of the present invention is described below. In the second embodiment, only a difference from the first embodiment is described. With regard to commonalities with the first embodiment, the same reference symbols are assigned in the drawing referred to in the description of the second embodiment, and overlapping description thereof is omitted.

Second Embodiment

Figure 3:
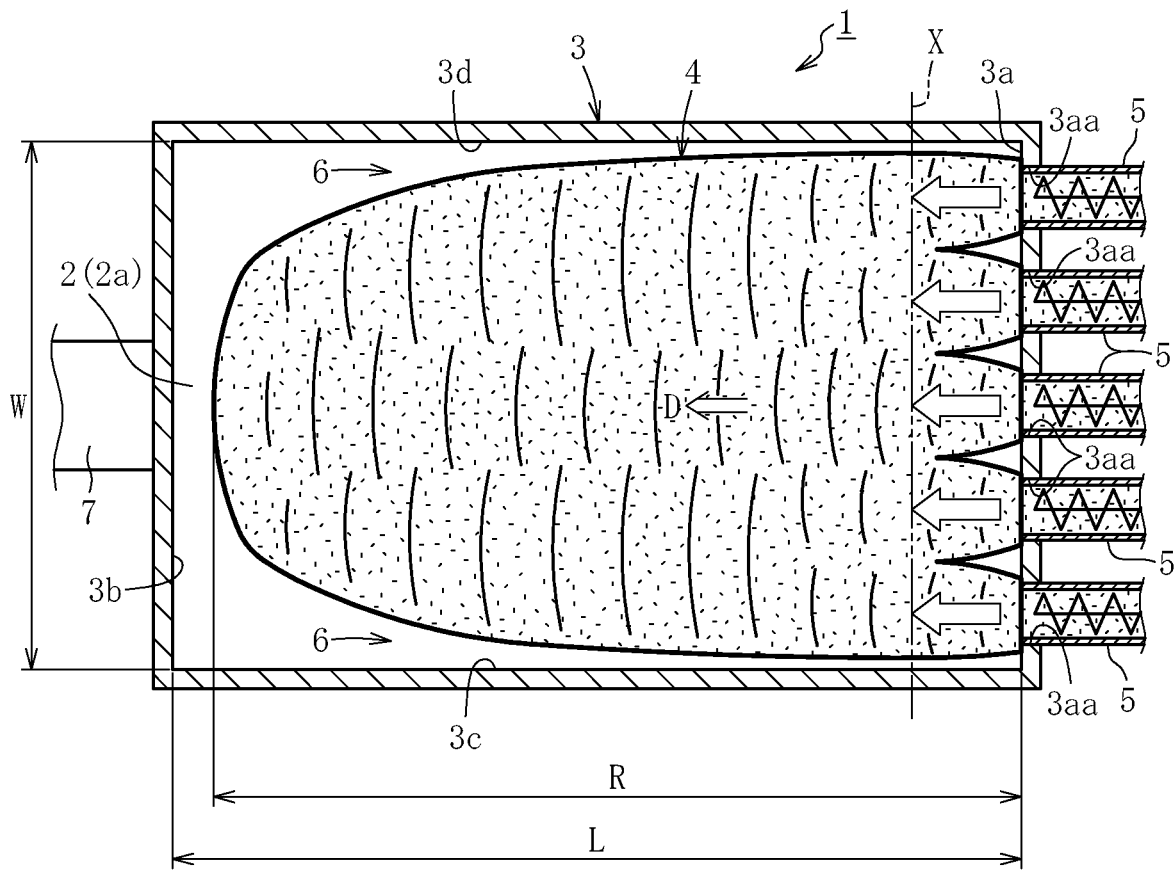
FIG. 3 is a transverse sectional plan view for illustrating a manufacturing method for a glass article according to a second embodiment of the present invention.

As illustrated in FIG. 3, the manufacturing method for a glass article according to the second embodiment differs from that of the first embodiment in the flowing of the glass raw material 4.

In the second embodiment, the glass raw materials 4 join with each other in the course of flowing from the front wall 3a side to the rear wall 3b side. Also by the manufacturing method for a glass article according to the second embodiment, the same main action and effect as in the first embodiment can be obtained.

A manufacturing method for a glass article according to a third embodiment of the present invention is described below. In the third embodiment, only a difference from the first embodiment is described. With regard to commonalities with the first embodiment, the same reference symbols are assigned in the drawing referred to in the description of the third embodiment, and overlapping description thereof is omitted.

Third Embodiment

Figure 4:
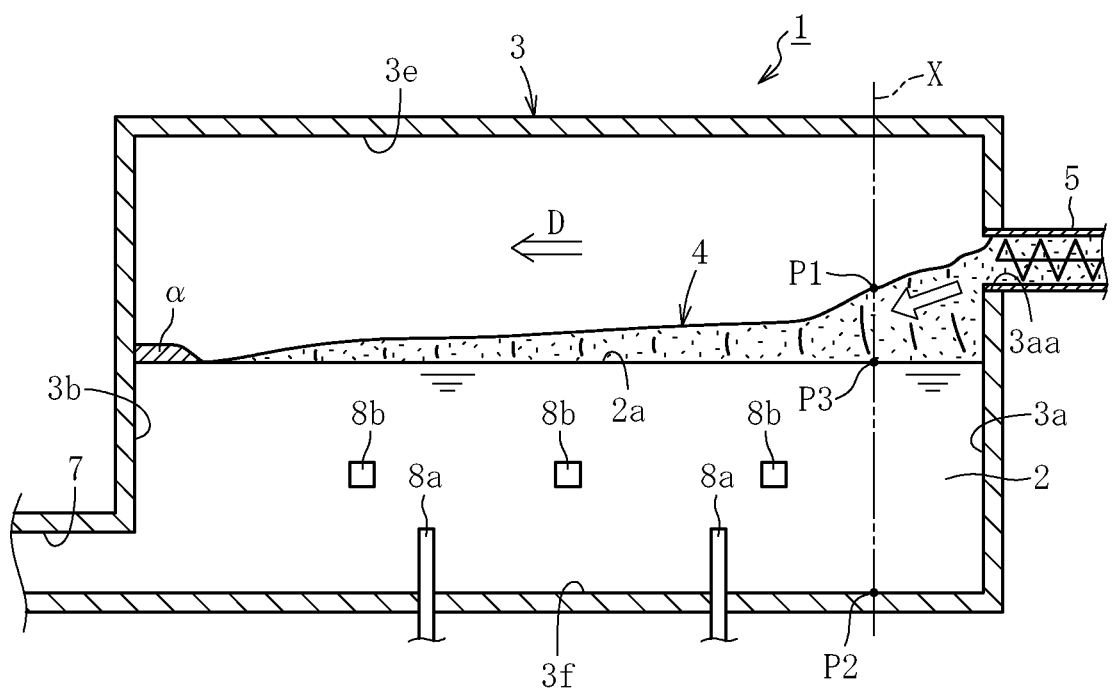
FIG. 4 is a longitudinal sectional side view for illustrating a manufacturing method for a glass article according to a third embodiment of the present invention.

As illustrated in FIG. 4, the manufacturing method for a glass article according to the third embodiment differs from that of the first embodiment in that a portion of the surface 2a of the molten glass 2 prevented from being covered with the glass raw material 4 is covered with a bubble layer α. The portion to be covered with the bubble layer α may be part or the whole of the portion prevented from being covered with the glass raw material 4.

When the portion prevented from being covered with the glass raw material 4, such as a gap between the glass raw material 4 located on the most downstream side and the rear wall 3b or the gap 6 between the glass raw materials 4 and 4, is covered with the bubble layer α, heat dissipation from the molten glass can be reduced, and thus the glass raw material 4 can be melted with higher energy conservation. From the viewpoint of promoting energy conservation, the total (S1+S2) of a ratio S1 of the area covered with the glass raw material 4 and a ratio S2 of the area covered with the bubble layer α is preferably 85% or more, more preferably 90% or more, most preferably 95% or more.

The "bubble layer α" as used herein refers to a surface glass layer under the state in which particles of the glass raw material 4 are melted to contain a gas in a large amount. The bubble layer α contains the gas, for example, at about 50 vol %. The glass raw material 4 may be mixed in the molten glass constituting the bubble layer α. The range covered with the bubble layer α may be adjusted by changing the temperature of the surface 2a of the molten glass 2 or a cullet ratio described below. When the temperature of the surface 2a of the molten glass 2 is reduced, the amount of the bubble layer α is increased. Meanwhile, when the temperature of the surface 2a of the molten glass 2 is increased, the amount of the bubble layer α is reduced. The temperature of the surface 2a of the molten glass 2 may be adjusted, for example, by changing the flow rate of a gas flowing into a gas phase space in an upper portion of the melting chamber 3 and/or the flow rate of the gas discharged from the gas phase space. In addition, when the value for the cullet ratio is excessively large or excessively small, the amount of the bubble layer α is reduced. When a specific value for the cullet ratio is achieved, the amount of the bubble layer α is maximized. The cullet ratio may be adjusted to fall within the range of, for example, from 5% to 50%. The "cullet ratio [%]" as used herein refers to the ratio of the mass of cullet contained in the glass raw material 4 to the mass of the glass raw material 4, and is a value calculated by the following expression: (mass [kg] of cullet/(mass [kg] of cullet+mass [kg] of batch raw material))×100.

Herein, the manufacturing method for a glass article according to the present invention is not limited to the modes described in the above-mentioned embodiments. For example, while the screw feeder 5 is used for supplying the glass raw material 4 in each of the above-mentioned embodiments, a pusher capable of pushing the glass raw material 4 from an outside to an inside of the melting chamber 3 (front wall 3a) may be used. In addition, the glass raw material may be supplied by one supply unit, but from the viewpoint of continued supply of the glass raw material at the time of maintenance of the supply unit, it is preferred to mount a plurality of (e.g., two to five) supply units and supply the glass raw material by the plurality of supply units at the time of non-maintenance.

In the case of alkali-free glass, it takes more energy and time to melt the glass raw material as compared to alkali-containing glass. Therefore, when the alkali-free glass is melted, the resultant molten glass is liable to include a heterogeneous base material or contain bubbles. That is, when the present invention is applied to the melting of the alkali-free glass, an improving effect on the quality of the glass article becomes remarkable. Accordingly, the glass article is preferably formed of the alkali-free glass. The "alkali-free glass" as used herein refers to glass substantially free of an alkali component (alkali metal oxide), and specifically refers to glass having a weight ratio of the alkali component of 3,000 ppm or less. In the present invention, the weight ratio of the alkali component is preferably 1,000 ppm or less, more preferably 500 ppm or less, most preferably 300 ppm or less.

While the electrodes having different shapes are used in combination by arranging the rod-shaped electrodes 8a and the sheet-shaped electrodes 8b in each of the above-mentioned embodiments, only electrodes having the same shape may be used. In addition, block-shaped electrodes may be used.

EXAMPLES

Example 1

As first Example of the present invention, 100 glass substrates were manufactured according to the same mode as in the first embodiment, and then the rate of occurrence of defects in the glass substrates was examined. In this case, each glass substrate was formed of alkali-free glass in accordance with a glass substrate for a display (product name: OA-11) manufactured by Nippon Electric Glass Co., Ltd. In addition, the rate of occurrence of defects was calculated by dividing the number of glass substrates in which a defect was detected by the number of the glass substrates having been manufactured.

In the examination, as shown in Table 1 below, the value for the distance R was changed to 0.3L, 0.5L, 0.6L, 0.7L, 0.8L, 0.9L, and 1.0L in a step-wise manner. Moreover, at each of those distances R, the ratio of the area of the surface 2a of the molten glass 2 covered with the glass raw material 4 was further changed to 30%, 50%, 60%, 70%, 80%, 90%, 95%, and 100% in a step-wise manner.

The results of the examination are shown in Table 1. Herein, under the conditions in which the ratio is 80%, a lower limit of the distance R is 0.8L, and the distance R cannot be set to less than 0.8L. Such unsettable conditions are represented by Symbol "-" in Table 1. In addition, the case in which the rate of occurrence of defects is inferior is represented by Symbol "x" in Table 1. In addition, the case in which the rate of occurrence of defects is satisfactory is represented by Symbol "○". In addition, the case in which the rate of occurrence of defects is excellent is represented by Symbol "⊚".

TABLE 1

| | | Distance R | | | | | | |
|---|---|---|---|---|---|---|---|---|
| | | 0.3 L | 0.5 L | 0.6 L | 0.7 L | 0.8 L | 0.9 L | 1.0 L |
| Ratio | 30% | X | X | X | X | X | X | X |
| | 50% | — | X | X | X | X | X | X |
| | 60% | — | — | ○ | ⊚ | ⊚ | ⊚ | ○ |
| | 70% | — | — | — | ○ | ⊚ | ⊚ | ⊚ |
| | 80% | — | — | — | — | ○ | ⊚ | ⊚ |
| | 90% | — | — | — | — | — | ○ | ○ |
| | 95% | — | — | — | — | — | — | ○ |
| | 100% | — | — | — | — | — | — | X |

From the results of the examination shown in Table 1, it is revealed that, under the conditions in which the ratio is from 60% to 95%, the rate of occurrence of defects in the glass substrates is satisfactory. This is presumably attributed to the achievement of both the prevention of excessive volatilization of components of the molten glass 2 and sufficient removal of bubbles contained in the molten glass 2.

Meanwhile, it is revealed that, under the conditions in which the ratio is 30%, 50%, or 100%, the rate of occurrence of defects in the glass substrates is inferior. Under the conditions in which the ratio was 30% or 50%, the occurrence of cords in the glass substrates was increased. In addition, under the conditions in which the ratio was 100%, the occurrence of bubbles in the glass substrates was increased.

In addition, under the condition in which the ratio was 60% and the distance R was 0.6L, under the condition in which the ratio was 70% and the distance R was 0.7L, under the condition in which the ratio was 80% and the distance R was 0.8L, and under the condition in which the ratio was 90% and the distance R was 0.9L, the gap 6 in which the glass raw material 4 was not present was not formed, and the rate of occurrence of defects in the glass substrates was satisfactory. Under the conditions in which the ratio was 60% and the distance R was 0.7L or more, under the conditions in which the ratio was 70% and the distance R was 0.8L or more, and under the conditions in which the ratio was 80% and the distance R was 0.9L or more, the gap 6 in which the glass raw material 4 was not present was formed. As a result, the removal of bubbles was further promoted, and the rate of occurrence of defects in the glass substrates was excellent.

Example 2

As second Example of the present invention, the following investigation was performed.

Under the state in which the ratio S1 of the area of the surface 2a of the molten glass 2 covered with the glass raw material 4 was fixed to 70%, with respect to a portion prevented from being covered with the glass raw material 4 (the remaining area of 30% after excluding the area of 70% covered with the glass raw material 4), the amount of the bubble layer α covering the portion was changed in a step-wise manner. Specifically, the ratio S2 (hereinafter represented as "bubble layer ratio") of the area of the surface 2a of the molten glass 2 covered with the bubble layer α was changed to 0%, 10%, 20%, and 30% in a step-wise manner. A desired bubble layer ratio was achieved by changing the flow rate of a gas flowing into a gas phase space in an upper portion of the melting chamber 3 to change the temperature of the surface 2a of the molten glass 2. In addition, the case in which the bubble layer ratio is 0% means that no bubble layer α is present on the portion prevented from being covered with the glass raw material 4, and the case in which the bubble layer ratio is 30% means that the portion prevented from being covered with the glass raw material 4 is entirely covered with the bubble layer α.

Moreover, electric energy required for the melting of the glass raw material 4 in the case in which the bubble layer ratio was 0% was defined as 100% and used as a standard. When the bubble layer ratio was changed to 10%, 20%, and 30%, in other words, the total (S1+S2) of the ratio S1 of the area covered with the glass raw material 4 and the bubble layer ratio S2 was changed, changes in electric energy required for the melting of the glass raw material 4 were investigated. In this investigation, whether the bubble layer ratio is high or low, the temperature of the molten glass 2 flowing through the outflow port 7 was made constant. The results of the investigation are shown in Table 2.

TABLE 2

| Bubble layer ratio S2 | Total (S1 + S2) | Electric energy use rate |
|---|---|---|
| 0% | 70% | 100% |
| 10% | 80% | 98% |
| 20% | 90% | 90% |
| 30% | 100% | 82% |

From the results shown in Table 2, it is revealed that the electric energy required for the melting of the glass raw material 4 can be suppressed more with an increase in bubble layer ratio. In this investigation, whether the bubble layer ratio was high or low, the rate of occurrence of defects in the glass substrates to be manufactured was not affected.

From the foregoing, it is inferred that the quality of the glass article can be improved by the manufacturing method for a glass article according to the present invention.

REFERENCE SIGNS LIST 1 glass melting furnace
2 molten glass
2a surface of molten glass
3 melting chamber
3a front wall
3b rear wall
3c side wall
3d side wall
3e ceiling wall
3f bottom wall
4 glass raw material
5 screw feeder
8a rod-shaped electrode
8b sheet-shaped electrode
D flowing direction
L distance (length)
R distance

The invention claimed is:

1. A manufacturing method for a glass article including a generate molten glass step, the generate molten glass step comprising:
   a supply step of supplying a glass raw material onto a surface of molten glass accommodated in a melting chamber of a glass melting furnace from a supply unit mounted to a front wall of the melting chamber;
   a melting step of melting the supplied glass raw material through heating with an electrode immersed in the molten glass in the melting chamber; and
   an outflow step of causing the molten glass to flow outside the melting chamber from an outflow port provided at a rear wall of the melting chamber,
   wherein 60% to 95% of an area of the surface of the molten glass in the melting chamber is covered with the glass raw material supplied in the supply step,
   wherein at least a part of a portion of the surface of the molten glass in the melting chamber, the portion being prevented from being covered with the glass raw material, is covered with a bubble layer,
   wherein a total (S1+S2) of a ratio S1 of an area of the surface of the molten glass in the melting chamber covered with the glass raw material and a ratio S2 of an area of the surface of the molten glass in the melting chamber covered with the bubble layer is 85% or more, and
   wherein, in the melting step, a burner imparting heat energy to the molten glass in the melting chamber is not used.

2. The manufacturing method for a glass article according to claim 1, wherein, when a length of the surface of the molten glass along a flowing direction of the glass raw material in the melting chamber is represented by L, and a distance between the glass raw material located on a most upstream side and the glass raw material located on a most downstream side in the flowing direction of the glass raw material supplied in the supply step is represented by R, the following relationship is satisfied in the generate molten glass step:

$$R \geq 0.65L.$$

3. The manufacturing method for a glass article according to claim 1, wherein a difference in temperature between a temperature of a surface of the glass raw material supplied in the supply step and a temperature of the molten glass present at a bottom wall of the melting chamber is set to 200° C. or more.

4. The manufacturing method for a glass article according to claim 1, wherein a difference in viscosity between a viscosity of the molten glass present at an interface with the glass raw material supplied in the supply step and a viscosity of the molten glass present at a bottom wall of the melting chamber is set to 2,500 dPa·s or more.

5. The manufacturing method for a glass article according to claim 1,
   wherein the front wall has mounted thereto a plurality of supply units, and
   wherein a gap in which the molten glass is exposed is formed between the glass raw materials supplied from the plurality of supply units.

6. The manufacturing method for a glass article according to claim 1, wherein in the melting step, the glass raw material is indirectly heated to be melted through the molten glass heated only with the electrode.

* * * * *